Dec. 26, 1967

W. G. HARRISON ET AL 3,360,106

ARTICLE CONVEYOR CONSTRUCTION

Filed July 21, 1966

INVENTORS
Walter G. Harrison
Leo A. Gary
Allan C. Audet by McDougall, Hersh
Scott and Ladd
Attys

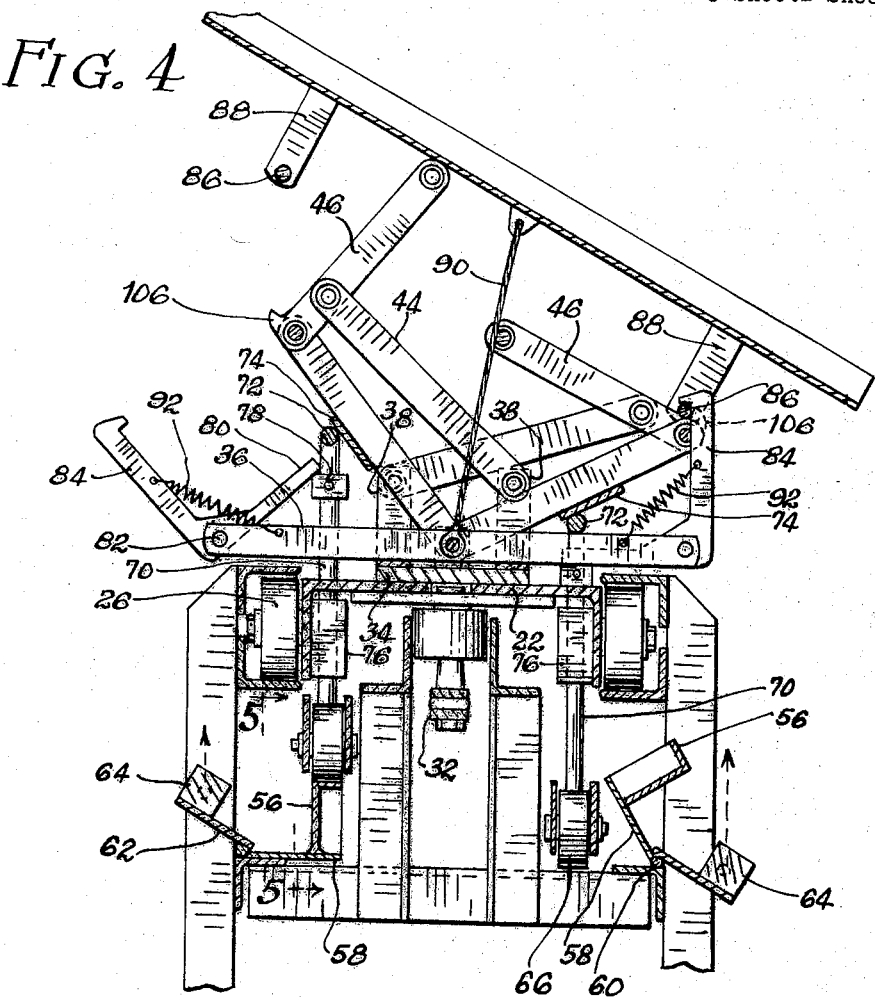
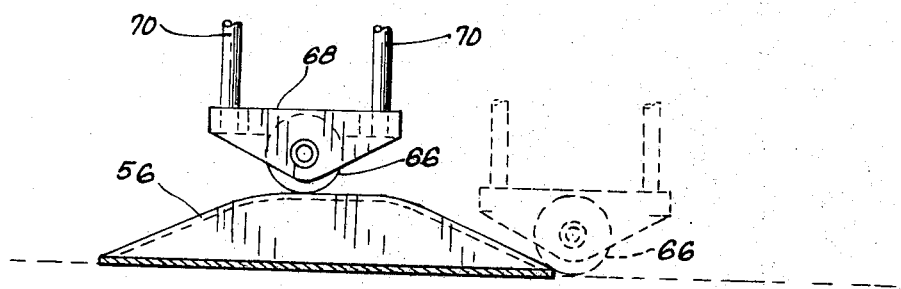

United States Patent Office 3,360,106
Patented Dec. 26, 1967

3,360,106
ARTICLE CONVEYOR CONSTRUCTION
Walter G. Harrison, Westchester, Leo A. Gary, Chicago, and Allan C. Audet, Arlington Heights, Ill., assignors to The Spra-Con Company, Chicago, Ill., a corporation of Illinois
Filed July 21, 1966, Ser. No. 566,804
15 Claims. (Cl. 198—155)

ABSTRACT OF THE DISCLOSURE

A conveyor apparatus including carriage means having trays supported thereon and means for tilting the trays to provide for discharge of articles. Each tray is supported on a carriage by means of a linkage assembly which includes pivotally connected links adapted to support the tray in a horizontal position and adapted to be extended by camming means to provide for tilting. The linkage assembly permits tilting in either direction depending upon which side of the tray is operated upon by the camming means. The trays are automatically unlatched from the horizontal position as the camming operation begins.

---

This invention relates to a conveyor construction adapted to transport articles along a conveyor path. The invention is particularly concerned with a conveyor mechanism suitable for transporting the articles to specific points along the path and for then automatically discharging the articles at said points whereby the articles can be sorted or otherwise distributed.

Conveyor means which are adapted to selectively deposit articles at various points along a conveyor path comprise extremely useful constructions. In post office operations, for example, large numbers of packages destined for different locations must be handled. The packages must be sorted so that all packages destined for respective locations can be collected for later delivery. Other operations may require the sorting of packages or other articles based on size considerations or for other reasons.

The instant invention will be described with reference to a post office operation wherein packages are placed on a conveyor at a given point and are then moved along the conveyor for discharge at any of several other points, depending upon the ultimate destination of the package. It will be understood that the instant invention is based on various structural concepts of the conveyor construction and, therefore, the invention is not to be limited by the specific operation described.

In the sorting of packages, bins or other collecting means are situated at several points along the conveyor path. The conveyor itself comprises a series of article carrying trays whereby the individual packages can be placed on successive trays of the conveyor at a loading station along the conveyor route. The trays then carry the packages past the bins located along the conveyor route and mechanisms are provided for automatically discharging the packages from the trays when they reach the desired bin.

As will appear from the following description, the discharge of the packages from the trays occurs when a signal is delivered by coding means. These coding means may be of any conventional type, for example of the type disclosed in U.S. Patent Nos. 3,167,192 or 3,034,665. It will be understood that the particular coding means for providing a signal permitting operation of the tray discharge mechanisms at a given station along the conveyor route do not form a part of the instant invention.

Prior art tray constructions provide discharge mechanisms which will faithfully discharge the packages at the desired station. It has been found, however, that the conveyor mechanisms are not particularly suitable for purposes of discharging packages which are somewhat fragile in nature. Thus, the conveyors often cause the packages to be actually thrown from the conveyor trays whereby a high incidence of breakage occurs. In addition, the "throwing" tendency of some constructions makes it difficult to accurately place the packages in a bin construction. With some arrangements, the articles will actually miss the bin whereby inconvenience results and whereby the likelihood of damage increases.

It is a general object of this invention to provide an improved conveyor construction which is particularly suitable for the handling of various articles whereby the articles can be transported along the conveyor path and discharged from the conveyor in a highly effective and efficient manner.

It is a more particular object of this invention to provide a conveyor construction of the type described which is adapted to remove the articles from the conveyor trays in a manner such that the likelihood of damage to fragile articles is greatly reduced.

It is a still further object of this invention to provide a conveyor construction of the type described which is adapted to effect removal of the articles in a manner such that the articles can be accurately located in collection areas along the conveyor path.

These and other objects of this invention will appear hereinafter and for purposes of illustration, but not of limitation, specific embodiments of the invention are shown in the accompanying drawings wherein:

FIGURE 4 is a vertical sectional view illustrating the tray construction as shown in FIGURE 1 in the discharge position;

FIGURE 5 is a detail fragmentary view taken about the line 5—5 of FIGURE 4;

Figure 1:
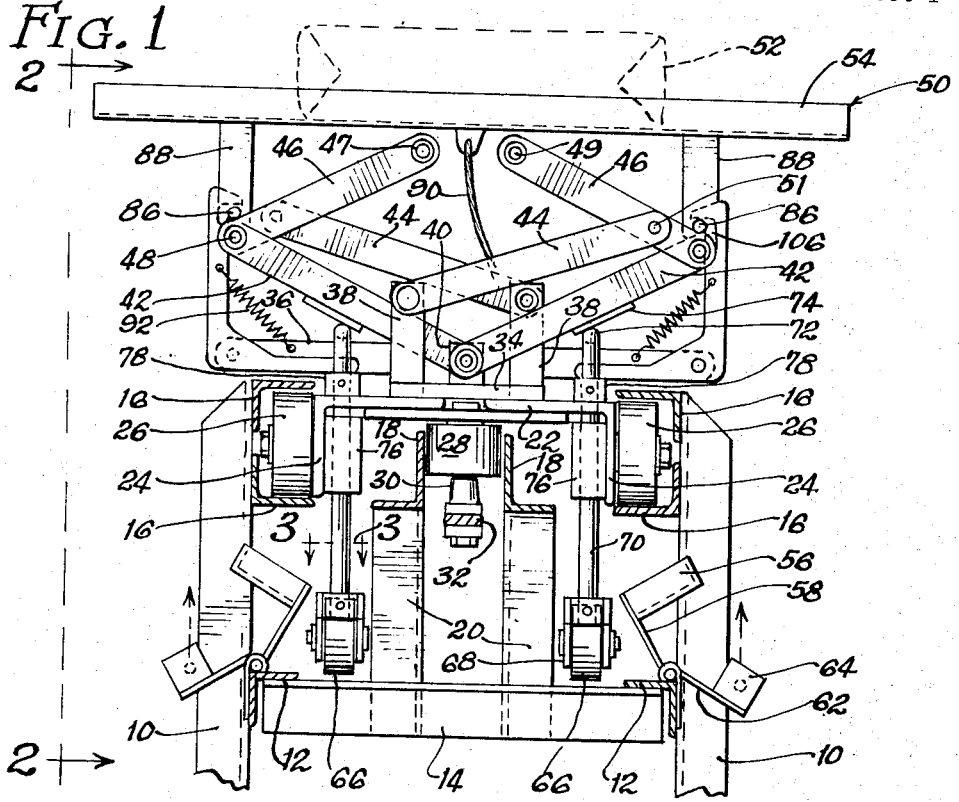
FIGURE 1 is a vertical elevational view comprising a section across the conveyor path illustrating the tray construction.

The constructions of this invention are intended to be employed in a system of the type illustrated in FIGURE 1 of Harrison et al. Patent No. 3,231,066. Specifically, the tray constructions to be described are supported on tracks which extend around the conveyor path. The trays are attached to each other by conventional means such as a chain mechanism. The trays, therefore, move in unison along the conveyor path with a loading zone being provided at one location along this path and with a plurality of discharge zones being located at other points along the conveyor path. The discharge zones may be situated on both sides of the conveyor path.

The conveyor construction comprises a supporting frame including upright members 10, longitudinally disposed members 12 and horizontally disposed members 14. Opposed sets of tracks formed by angles 16 are mounted on the upright members 10. A second track arrangement is provided by angle members 18 which are mounted on vertical supports 20, these supports being attached to the horizontal members 14.

The conveyor trays comprise an underframe element 22 formed in the shape of a channel. The underframe includes side members 24 which carry shafts for rotatably mounting wheels 26. These wheels ride in the track arrangement formed by the angle members 16.

The underframe also carries a downwardly extending mounting means for wheel 28. This wheel rides in the track formed by the angle members 18.

Beneath the wheel 28, there is provided a member 30 which is adapted to be connected to a chain or other elongated structure designated by the numeral 32. The structure 32 is adapted to interconnect all of the trays which extend in a line along the conveyor path. Where a chain element forms the structure 32, suitable sprockets can be located at intervals along the path to impart driving action to the line of conveyor trays. A plate 34 is mounted on top of the underframe member 22. This plate carries a pair of cross arms 36 along with upright link supports mounted at each end. The supports at each end comprise side members 38 and a central member 40.

Figure 2:
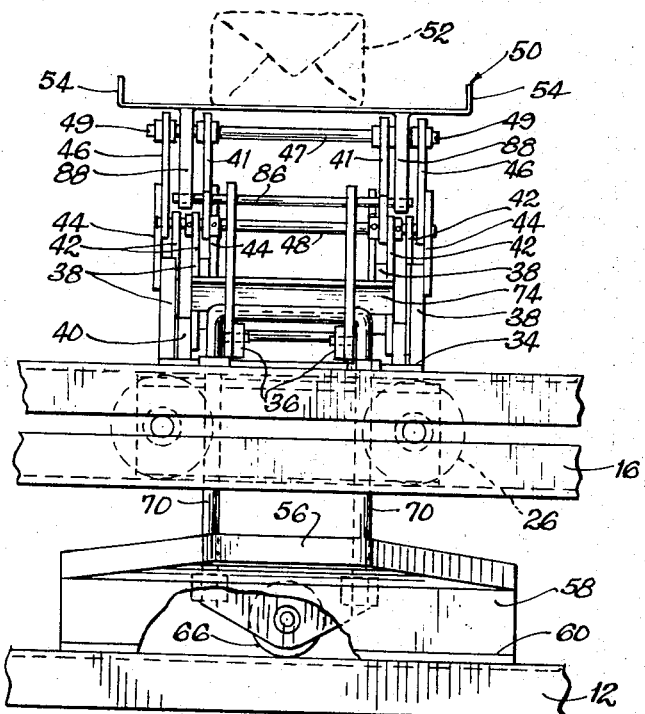
FIGURE 2 is a side elevational view of the tray construction taken about the line 2—2 of FIGURE 1.
Figure 3:
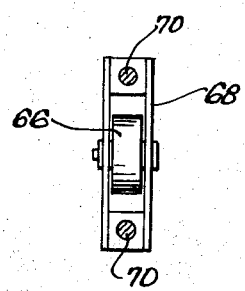
FIGURE 3 is a detail sectional view, taken about the line 3—3 of FIGURE 1, illustrating the tray tilting actuating member.

The central member 40 pivotally carries a pair of links 42 while the side members 38 each pivotally carry a link 44. The links 42 are connected at one end of links 46 while the links 44 are connected to the links 46 at points spaced from said one end. As shown in FIGURE 2, a set of the links 42, 44 and 46 is located at each end of the plate 34 on the supports 38 and 40.

Rods 47 and 49 connect the respective upper ends of the links 46. Rods 48 and 51 provide a pivotal mounting for the joined ends of the links 42 and 46.

The link assembly described operates to provide for tilting of the trays 50 for purposes of discharging packages 52. The tray 50 includes upstanding leading and trailing edges 54 so that the package can be held in place during movement of the tray along the conveyor route. The sides of the tray are open to permit sliding of the package off the tray for discharge.

Tilting of a tray for discharging purposes is accomplished by means of a pivotally mounted tilting cam 56. The cam is mounted on a bracket 58 which is pivotally connected at 60 to the longitudinal frame member 12. An extension 62 of the bracket 58 includes a weighted member 64 which serves to normally hold the cam elements in the position shown in FIGURE 1. Actuating means such as a solenoid or piston member can be attached to the extension 62. Suitable coding means can be employed to provide for operation of the actuating means whereby the cam 56 will be pivoted to the position shown at the left-hand side of FIGURE 4.

When the cam 56 is pivoted to discharge actuating position, a wheel 66 is adapted to ride up the cam surface. As shown in FIGURE 5, the wheel 66 is rotatably mounted in a casing 68 which is attached to legs 70 of a U-shaped element. The base 72 of this U-shaped element comprises an actuating member. This base bears against plates 74 which are attached to and suspended between the links 42 on opposite sides of the tray.

The legs 70 are reciprocally movable in guide members 76 which are secured to the side members 24 of the underframe 22. The legs 70 carry a pair of cylindrical elements 78 which are secured thereto by means of set screws. The cylindrical elements 78 engage the legs 80 of a latching lever which is attached to the cross arm 36 by a pivotal connection 82. The other leg 84 of this lever includes a latching end member which extends over rod 86. The rod 86 is suspended between downwardly extending bars 88 attached to the under side of the tray 50.

In the operation of the structure shown in FIGURES 1 through 5, the trays normally move along the conveyor path without interference from the cam elements 56. When the elements are actuated for discharge purposes, a wheel 66 of a tray will ride up the cam surface thereby lifting the U-shaped member supporting the wheel. It will be noted that the wheels 66 are located on both sides of a tray construction. The linkage mechanism is identical on both sides of the construction whereby a tray can be tilted in either direction, depending on which of the cam elements is actuated at a given location along the conveyor path. It is also to be noted that the actuating means which initially disposes the cam element in the path of a wheel 66 should be de-energized shortly after a wheel 66 engages the cam element. With this arrangement, the weight 64 will bring the cam elements back to its normal position as soon as the wheel 66 passes the cam element. Accordingly, the cam 56 will be out of position for the next tray unless its actuating means are re-energized.

As the U-shaped element rises with the wheel 56, the latching lever will be pivoted through the action of the cylindrical elements 78. This will unlatch the tray permitting tilting movement.

The tilting movement is accomplished through engagement of the base 72 of the U-shaped element with the plate 74. The movements of the links during this tilting operation are illustrated in FIGURE 4. A cable 90 is attached at one end to the tray 50 and at the other end to central member 40, this cable functioning to limit the amount of tilting which can be accomplished by the tray.

The tray is restored as the wheel 66 rides down the cam 56. A spring 92 is attached at one end to the latching lever and at the other end to the cross arm 36 for restoring the latch as the tray returns to normal position.

Figure 7:
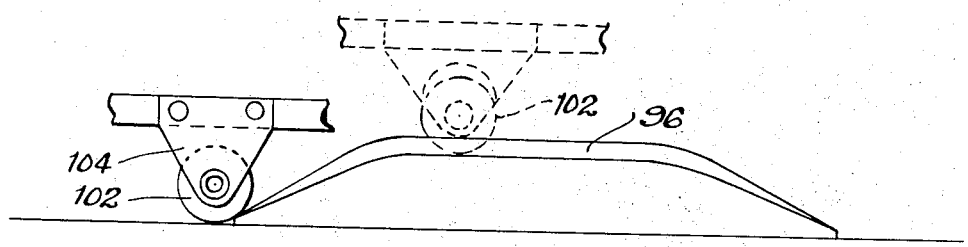

The structure of FIGURES 1 through 5 is adapted to be employed in a wide variety of conveyor arrangements. The structure can be readily incorporated in an arrangement which provides for horizontal movement of the trays throughout the conveyor path. On the other hand, the structure is perfectly suitable for arrangements such as shown in FIGURES 2 and 7 of Patent No. 3,231,066. Thus, the latching features incorporated in the structure hold the trays in position even when the trays are disposed upside down during a return portion of the conveyor cycle.

Figure 6:
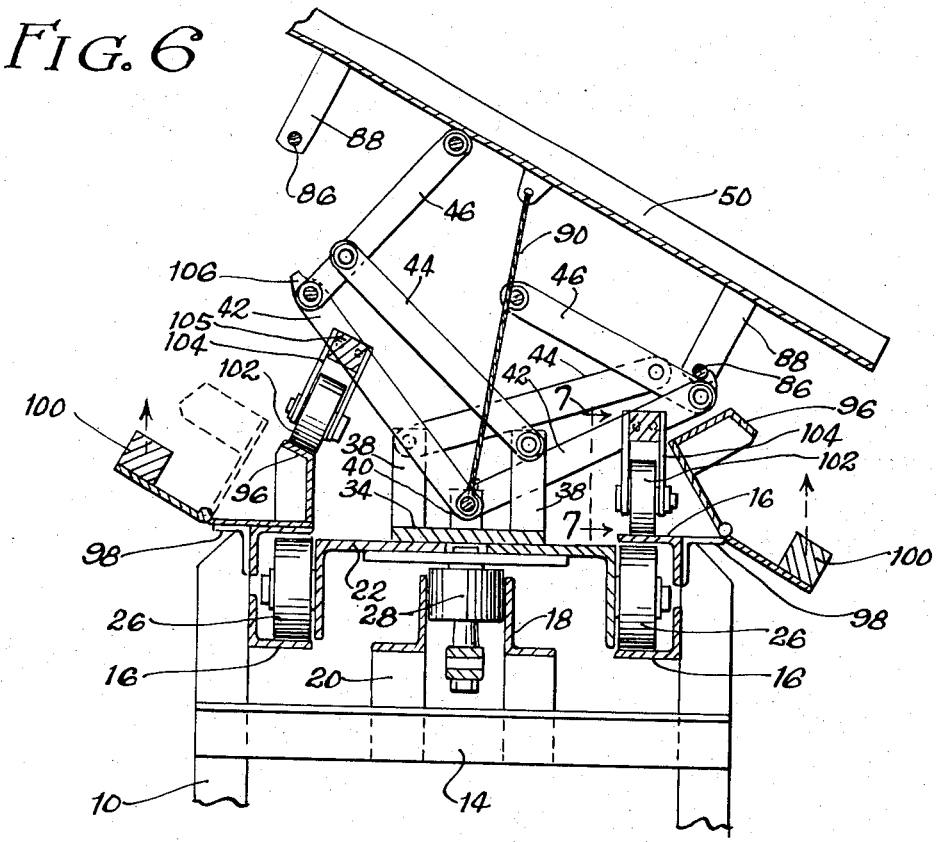
FIGURE 6 is a vertical elevational view comprising a section across the conveyor path illustrating an alternative tray construction; and, FIGURE 7 is a detail fragmentary view taken about the line 7—7 of FIGURE 6.

FIGURES 6 and 7 illustrate a somewhat simpler verversion of a tray construction incorporating the features of this invention. This construction is more compact and is ideally suited for a conveyor arrangement wherein the trays are maintained in substantially horizontal positions during their entire movement through the conveyor path.

This alternative construction comprises frame elements 10, 14 and 20 and tracks 16 and 18 of the type described with reference to the other embodiment. An underframe member 22 carries wheels 26 and 28 for riding on the tracks. A plate 34 is attached to the underframe element, and support members 38 and 40 are provided for links 42, 44 and 46. The links are adapted to impart tilting movement of the tray 50, and a cable 90 is provided for limiting the tilting movement. Bars 88 extend downwardly from the tray and a rod 86 is suspended between these bars.

Tilting action of the trays is accomplished by means of a cam 96 which is pivotally attached to angles 98, the latter being attached to upright track angles 16. A weight 100 normally holds the cams in a position out of the path of movement of the wheels 102.

The wheels 102 are rotatably mounted in brackets 104 which are secured to a cross member 105 suspended between links 42. When a cam 96 is pivoted into tray discharge position, a wheel 102 will ride up the cam whereby linkage mechanisms will be operated through the wheel for achieving the discharge action.

The links 46 of both embodiments of the invention include a tongue 106 at their ends. The rods 86 are fitted adjacent these tongues when the trays are in the normal position whereby stability is provided in the construction.

It has been found that the arrangement described is particularly suitable for the handling of articles in conveyor constructions, particularly where the articles are somewhat fragile in nature. This is particularly desirable in the case of post office operations where many different types of packages must be carefully handled to avoid breakage of the contents.

The linkage mechanism as well as the actuating mechanisms described provide the desired discharge characteristics. It has been found that an extremely smooth operation results with the system of this invention whereby any throwing of the packages can be eliminated. The packages slide off the trays in an extremely smooth manner, and extremely accurate discharge can also be achieved.

The structures described are also highly desirable in that relatively basic operating mechanisms are required whereby relatively low manufacturing and maintenance expenses can be realized. Furthermore, the concepts of this invention are susceptible to incorporation into extremely compact units, for example, as shown in FIGURE 6, whereby space saving advantages are realized.

It will be understood that various changes and modifications may be made in the construction of this invention which provide the characteristics of this invention without departing from the spirit thereof, particularly as defined in the following claims.

That which is claimed is:

1. In a conveyor apparatus adapted to ride on track means along a predetermined path, said apparatus including carriage means for transporting articles, and means for tilting said carriage means for discharging said articles, the improvement in said carriage and discharge means comprising trays for holding said articles, cam followers, means connecting said cam followers to said trays, cam means located at spaced points along said path adapted to be selectively interposed in the path of movement of said cam followers, and a linkage assembly attached to said trays and operable in response to movement of said cam followers for tilting of said trays, said assembly comprising a first link means having one end pivotally connected to the supporting frame of said tray, a second link means pivotally connected at one end of the other end of said first link means, the opposite end of said second link means engaging the under side of said tray for imparting tilting movement thereto, and a third link means interconnecting said second link means and said tray frame.

2. An apparatus in accordance with claim 1 wherein said cam followers are attached on opposite sides of said trays and wherein said cams are situated on both sides on said conveyor path, and including at least one set of said link means extending on both sides of each tray whereby said trays are adapted to be tilted toward either side of the conveyor.

3. A construction in accordance with claim 2 wherein said first link means comprise a pair of members extending from a central support attached to said tray frame, said second link means comprising a pair of members pivotally connected to the first link means and extending toward each other beneath the tray, additional supports attached to said frame on opposite sides of said central support, said third link means comprising a pair of members extending from said additional supports to intermediate points of pivotal attachment with said second link means.

4. A construction in accordance with claim 3 wherein sets of said link means are located at the leading and trailing edges of each of said trays.

5. A construction in accordance with claim 4 comprising bearing plates connected to said first link means, said bearing plates being located on opposite sides of the tray construction and being suspended between the first link means of said sets, and including means actuated by said cam follower for engaging said bearing plate to thereby move the link assembly for tilting of the trays.

6. A construction in accordance with claim 1 wherein said cam follower comprises a normally vertically extending member, and means connecting the upper end of the cam follower to said first link means whereby engagement of said cam follower with said cam imparts vertical movement to the cam follower for consequent movement of the link assembly.

7. A construction in accordance with claim 6 wherein said cam follower comprises a vertically reciprocal member having a slideable connection with said first link means.

8. A construction in accordance with claim 6 wherein said cam follower is rigidly secured to said first link means.

9. A construction in accordance with claim 1 wherein each cam means comprises a pivotally mounted member adapted to be swung into the path of said cam follower for initiating tilting of a tray, and including means associated with said cam for normally holding the cam out of the path of said follower whereby the cam will be automatically restored after disengagement by said cam follower.

10. A construction in accordance with claim 9 wherein said cam is mounted beneath the tray, and wherein said cam follower comprises a vertically reciprocal member whereby the cam follower is adapted to move upwardly in response to engagement with said cam.

11. A construction in accordance with claim 1 including latching means normally securing said trays in a horizontal position, and means associated with said cam follower for disengaging said latching means upon engagement of the cam follower with said cam.

12. A construction in accordance with claim 11 wherein said latching means comprise a pivotally mounted member, means associated with said cam follower for engaging an extension of said latching means, said cam follower being vertically movable upon engagement with said cam and wherein vertical movement of said cam follower operates to pivot said latching means out of latching position.

13. In a conveyor apparatus adapted to ride on track means along a predetermined path, said apparatus including carriage means for transporting articles, and means for tilting said carriage means for discharging said articles, the improvement in said carriage and discharge means comprising trays for holding said articles, cam followers, means connecting said cam followers to said trays, cam means located at spaced points along either side of said path adapted to be selectively interposed in the path of movement of said cam followers, and a linkage assembly attached to said trays and operable in response to movement of said cam followers for sidewise tilting of said trays in either direction, said cam followers comprising movable members adapted to move upwardly upon engagement with said cams, latching means for normally holding said trays in a horizontal position, said latching means operating in response to upward movement of the cam followers whereby said latching means will disengage to permit tilting of the trays, the upper end of said cam followers being connected to said linkage assembly for imparting movement thereto and for thereby causing said assembly to tilt an associated tray.

14. In a conveyor apparatus adapted to ride on track means along a predetermined path, said apparatus including carriage means for transporting articles, and means for tilting said carriage means for discharging said articles, the improvement in said carriage and discharge means comprising trays for holding said articles, cam followers, means connecting said cam followers to said trays, cam means located at spaced points along said path adapted to be selectively interposed in the path of movement of said cam followers, and a linkage assembly attached to said trays and operable in response to movement of said cam followers for tilting of said trays, said cam followers comprising members mounted for reciprocal movement on said tray frame, latching means for normally holding said trays in a horizontal position, and means attached to said cam followers for engagement with said latching means upon upward movement of the cam followers whereby the latching means will disengage to permit tilting of the trays, the upward movement of the cam followers occurring upon engagement with said cams, the upper end of said cam followers being connected to said linkage assembly for imparting movement thereto and for thereby causing said assembly to tilt an associated tray.

15. In a conveyor apparatus adapted to ride on track means along a predetermined path, said apparatus including carriage means for transporting articles, and means for tilting said carriage means for discharging said articles, the improvement in said carriage and discharge means comprising trays for holding said articles, cam followers, means connecting said cam followers to said trays, cam means located at spaced points along said path adapted to be selectively interposed in the path of movement of said cam followers, and a linkage assembly attached to said trays and operable in response to movement of said cam followers for tilting of said trays, said cam followers comprising vertically movable members adapted to move upwardly upon engagement with said cams, the upper end of said cam followers being connected to said linkage assembly for imparting movement thereto and for thereby causing said assembly to tilt an associated tray, each of said cam means comprising a pivotally mounted member adapted to be swung into the path of a cam follower for initiating tilting of a tray, and including means associated with said cam means for normally holding the cam means out of the path of said follower whereby the cam means will be automatically restored after disengagement by said cam follower.

References Cited

UNITED STATES PATENTS 2,833,427   5/1958   James _____ 214—62

RICHARD E. AEGERTER, *Primary Examiner.*